United States Patent
Goergen (10) Patent No.: US 9,128,638 B2
(45) Date of Patent: Sep. 8, 2015

(54) INTEGRATED TIME-STAMPED EVENT RECORDER

(71) Applicant: Progress Rail Services Corporation, Albertville, AL (US)

(72) Inventor: Todd Charles Goergen, Blue Springs, MO (US)

(73) Assignee: Progress Rail Services Corporation, Albertville, AL (US)

( * ) Notice: Subject to any disclaimer, the term of this patent is extended or adjusted under 35 U.S.C. 154(b) by 149 days.

(21) Appl. No.: 13/947,204

(22) Filed: Jul. 22, 2013

(65) Prior Publication Data
US 2015/0021444 A1    Jan. 22, 2015

(51) Int. Cl.
*B61L 25/02* (2006.01)
*G06F 3/06* (2006.01)
*B61L 3/00* (2006.01)
*B61L 15/00* (2006.01)

(52) U.S. Cl.
CPC .............. *G06F 3/0683* (2013.01); *B61L 3/002* (2013.01); *B61L 15/0081* (2013.01); *G06F 3/0604* (2013.01); *G06F 3/0647* (2013.01)

(58) Field of Classification Search
CPC . B61L 15/00; B61L 15/0018; B61L 15/0027; B61L 15/0072; B61L 25/00; B61L 25/02; B61L 25/021; B61L 25/04
USPC ... 246/1 R, 1 C, 2 R, 3, 108–110, 122 R, 123
See application file for complete search history.

(56) References Cited

U.S. PATENT DOCUMENTS

| | | | | |
|---|---|---|---|---|
| 5,185,700 | A | * | 2/1993 | Bezos et al. .................. 701/33.4 |
| 5,978,718 | A | | 11/1999 | Kull |
| 6,735,505 | B2 | * | 5/2004 | Levine .......................... 701/33.4 |
| 7,180,407 | B1 | * | 2/2007 | Guo et al. ..................... 340/436 |
| 7,593,963 | B2 | * | 9/2009 | Ballesty et al. ....................... 1/1 |
| 7,965,312 | B2 | | 6/2011 | Chung et al. |

(Continued)

FOREIGN PATENT DOCUMENTS

CA      2 652 938      8/2009

OTHER PUBLICATIONS

U.S. Appl. No. 13/795,174, filed Mar. 12, 2013, "Recording System and Method for Vehicle", Todd Charles Goergen.

*Primary Examiner* — R. J. McCarry, Jr.
(74) *Attorney, Agent, or Firm* — Finnegan, Henderson, Farabow, Garrett & Dunner, LLP (57) ABSTRACT

An event recorder includes an outer case, and a first memory module including a first amount of data storage capacity contained within the outer case. The first memory module is configured to receive and store multiple types of data including at least two of: video data; audio data; locomotive data indicative of one or more locomotive operating parameters, locomotive control signals, and locomotive performance characteristics; engine operating parameter data; exhaust characteristics data; electrical data; and positive train control data. A controller contained within the outer case may be configured to associate a universal time stamp with each of the multiple types of data stored in the first memory module. An inner, crash-hardened case may be contained within the outer case, containing a second memory module including a second amount of data storage capacity that is smaller than the first amount. The controller may be further configured to periodically transfer a portion of the time-stamped data stored in the first memory module to the second memory module.

20 Claims, 2 Drawing Sheets

(56) References Cited

U.S. PATENT DOCUMENTS 7,990,639 B2 * 8/2011 Ouellette et al. ................. 360/1
2010/0073493 A1 * 3/2010 Godfrey et al. ............ 348/208.2
2011/0216200 A1 9/2011 Chung et al.

* cited by examiner

INTEGRATED TIME-STAMPED EVENT RECORDER

TECHNICAL FIELD

The present disclosure relates generally to an event recorder and, more particularly, an integrated time-stamped event recorder.

BACKGROUND

Event recorders provided on various mobile vehicles such as planes and trains are generally designed to record data associated with an event during operation of the vehicle. The event recorders are typically designed and built to store that recorded data in a crash-hardened memory unit. A crash-hardened memory unit is configured to withstand the severe conditions that may occur during an accident. The memory units for these event recorders are contained within enclosures that allow the stored data to remain intact after accidents or other abnormal events. An important purpose of the event recorder is to provide a source of data that can be retrieved from the event recorder after an event such as an accident, and provide a detailed and accurate accounting of exactly what happened leading up to and during the event.

On-scene investigations after events involving mobile vehicles are time consuming and are not always accurate. Often, investigators must rely on witness statements and approximations to assess the events and the relative timing of the events leading up to the accident and to determine who is at fault. It is therefore difficult to guarantee the correctness of these assessments. Insurance companies use these assessments to determine who must pay for the damage after an accident has occurred. Incorrect assessments lead to money being spent unnecessarily by the insurance companies whose clients were not at fault.

A system capable of recording, reproducing and analyzing information pertaining to an accident is very valuable. Traffic delays caused while an accident is being investigated could be decreased since less investigation time at the scene of the accident would be required. Investigations would be more accurate since the system will provide precise data prior to, during, and after the accident. Additionally, insurance companies will benefit due to improved investigation assessments. Existing event recorders often are capable of recording only specific types of data such as limited amounts of video and/or audio data, or data provided by sensors that measure vehicle operating characteristics. During accident reconstruction, the various types of data must be synchronized after the fact by stitching together the different types of data relative to different time sources associated with each of the different types of data. This process requires complex software and may lead to inaccuracies in the perceived relative timing of different recorded data.

One attempt to record video information at each signaling device positioned along a train track is disclosed in U.S. Pat. No. 5,978,718 of Kull that issued on Nov. 2, 1999 (the '718 patent). The '718 patent provides a rail vision system employed to visually read signal aspect information from each signaling device. The '718 patent also warns a train operator of restrictive signal aspects and, if the train operator fails to acknowledge the warning, imposes a brake application.

Although the system of the '718 patent may improve safety and aid in investigations regarding the operation of a locomotive, it may be less than optimal. In particular, the disclosed system of the '718 patent does not provide a system for recording multiple types of data to a crash-hardened memory. Moreover, the '718 patent also does not provide a system for associating a universal time stamp from a single time source with all of the different types of data that are being written to the crash-hardened memory in order to facilitate accurate synchronization of the data for event reconstruction.

The system and method of the present disclosure solves one or more problems set forth above and/or other problems in the art.

SUMMARY

In one aspect, the present disclosure is directed to an event recorder that includes an outer case and a first memory module having a first amount of data storage capacity contained within the outer case. The first memory module may be configured to receive and store at least two of multiple types of data. The types of data may include video data and audio data. Additional types of data may include locomotive data indicative of one or more locomotive operating parameters, locomotive control signals, and locomotive performance characteristics. Still further types of data may include engine operating parameter data, exhaust characteristics data, electrical data, and positive train control data. The integrated event recorder may also include a controller contained within the outer case and configured to associate a universal time stamp with at least two of the types of data stored in the first memory module. The integrated event recorder may further include an inner, crash-hardened case contained within the outer case. The inner, crash-hardened case may contain a second memory module having a second amount of data storage capacity that is smaller than the first amount. The controller may be further configured to periodically transfer a portion of the time-stamped data stored in the first memory module to the second memory module.

In another aspect, the present disclosure is directed to a method of storing data for later re-creation of an event in the operation of a train. The method may include receiving at least two of multiple types of data. The multiple types of data may include video data and audio data. Additional types of data may include locomotive data indicative of one or more locomotive operating parameters, locomotive control signals, and locomotive performance characteristics. Still further types of data may include engine operating parameter data, exhaust characteristics data, electrical data, and positive train control data. The positive train control data may include data indicative of an actual location of the train and command signals that implement control of the actual location of the train. The method may further include associating a universal time stamp with at least two of the multiple types of data, and storing the time-stamped data in a first memory module contained within an outer case. A portion of the stored, time-stamped data may be periodically transferred from the first memory module to a second memory module contained within a crash-hardened inner case within the outer case.

DETAILED DESCRIPTION

Figure 1:
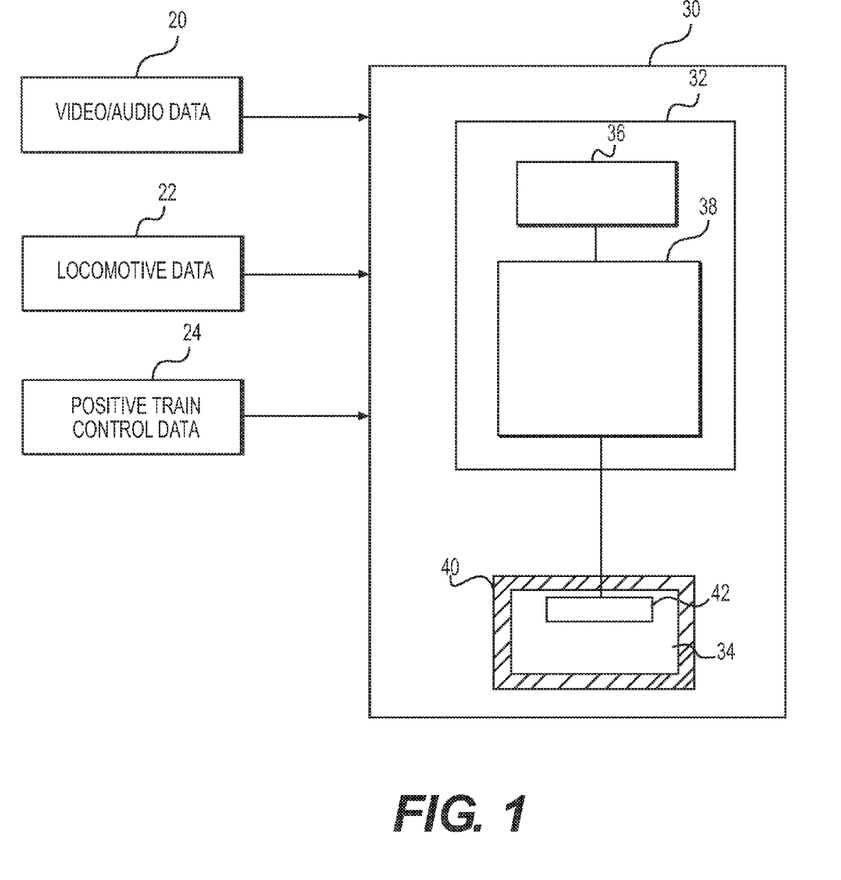
FIG. 1 is a block diagram of an exemplary disclosed integrated event recording system.

Referring to FIG. 1, an exemplary implementation of an event recorder according to this disclosure may include an outer case 30 configured to contain a longer-term memory processing unit 32, including a controller 36 and a first memory module 38 having a first amount of data storage capacity. Outer case 30 may also be configured to contain a shorter-term memory processing unit with a controller 42 and a second memory module 34 having a second amount of data storage capacity that is less than the first amount. One of ordinary skill in the art will recognize that first memory module 38 and/or second memory module 34 may be configured as solid state memory devices or other types of data storage devices that may provide non-volatile random access memory (RAM). Controller 42 and second memory module 34 may be contained within a crash-hardened inner case 40 within outer case 30. Crash-hardened inner case 40 may be configured to withstand the severe conditions that may accompany an accident. In one exemplary implementation, crash-hardened inner case 40 housing second memory module 34 may be insulated, cushioned, and sealed with various materials and structures that provide desired temperature, shock, fluid, chemical, and fire resistance in accordance with industry standards or requirements. A longer-term time period, as used throughout this disclosure, may refer to a time period that is from 15-20 minutes, to many hours or even days in length, while a shorter-term time period may refer to a time period that is less than 15-20 minutes in length.

A shorter-term time period of data to be stored in second memory module 34 may be selected based at least partially upon the length of time before an event, such as an accident, that may include significant data or signals potentially relevant to determining the cause of the event. Data or signals that may be considered significant or relevant to determining the cause of an event may be data indicative of parameters, characteristics, or commands, but for the existence of which, the event would most likely not have happened. A determination of which data may be relevant to determining the cause of an event may be based at least in part on one or more of empirical data and historical data. In the case of an integrated event recorder mounted on a locomotive, significant data or signals may include data indicative of locomotive operating parameters, locomotive control signals, locomotive performance characteristics, and sounds and sights both internal to and external to the locomotive as detected by audio and video sensors. Other significant data may be indicative of engine operating parameters, exhaust characteristics, and electrical parameters. Operator or central control commands and other wireless signals or wired signals provided over multi-unit (MU) trainline communication buses may also be provided to the event recorder. Still further significant data may include data indicative of environmental conditions, geographical location, or other unusual conditions or events exterior to the vehicle on which the integrated event recorder is mounted.

Controller 36 and controller 42 may embody single or multiple microprocessors that may form one or more modules configured (e.g., programmed) for requesting and/or receiving various types of data. The various types of data may include video data and audio data. Other types of data may include locomotive data indicative of one or more locomotive operating parameters, locomotive control signals, and locomotive performance characteristics. Engine operating and performance data may also be requested and received by controllers 36, 42. Additional types of data may include, but are not limited to electrical data, exhaust characteristics, and positive train control (PTC) data. PTC data is indicative of the actual location of a train at all times, such as may be obtained from one or more global positioning system (GPS) sensors, and autonomous command signals that implement control of the actual location of the train and where the train is allowed to move for safety reasons. Controller 36 may also be configured for associating and encoding a universal time stamp derived from a common time source with each of the various types of data in order to enable real-time synchronization of all the recorded data, for example, when re-creating the relevant data obtained leading up to an event. By associating a universal time stamp with all of the various types of data received by controller 36, controller 36 may avoid the need to stitch together the various types of data after the data has been separately recorded and associated with separate time sources that may not reflect exactly the same time. As one non-limiting example, controller 36 may receive frames of video and/or audio data from an internet protocol (IP) camera mounted at the front of the train, and record that data side-by-side with other types of data received at the same point in time. The point in time associated with each of the different types of data may be a universal time stamp in that it is derived from a common time source for all of the types of data. The other types of data may include the sound of a train horn, actuation of a brake lever by an operator, a signal received from a GPS sensor, a change in throttle setting, a sudden change in exhaust characteristics, the position of the train relative to a train crossing, and the speed and acceleration or deceleration of the train.

The separation of the contents of outer case 30 into a longer-term memory processing unit 32 with controller 36 and first memory module 38, and a shorter-term memory processing unit with controller 42 and second memory module 34, enables the event recorder in accordance with this disclosure to process a greater amount of data while retaining only the most recent, relatively smaller amount of data that may be potentially relevant to an investigation of an event in crash-hardened memory. As discussed above, crash-hardened inner case 40 may be insulated and otherwise constructed to protect secondary memory module 34 from destructive exposure to extreme temperatures, fluids, and shocks. As a result, heat generated by the process of storing data in second memory module 34 may raise the temperatures within crash-hardened inner case 40 as the heat is not readily dissipated. Therefore, it may be desirable to limit the amount of data that is actually stored in second memory module 34 at any point in time.

The amount of data stored may be related to a length of time immediately preceding an event, such as an accident, that may be of interest in the process of re-creating the accident. The frequency at which different types of data are captured by various sensors and recorded may also be a factor in the determination of how long a period of time and/or amount of data may be stored in second memory module 34. As one non-limiting example, controller 36 may be configured to recognize the presence of certain geographical or structural characteristics, such as a wayside signal positioned ahead of a train crossing, a switch yard, or a curve in the track or change in terrain indicative of an approaching tunnel, as determined from a stored map. Controller 36 may be configured to then direct an increase in the length of time or amount of data that is transferred from first memory module 38 to second memory module 34. Controller 36 may also be configured to change the frequency at which image data, or other types of data, are provided by sensors to the controller. Alternatively, or in addition, controller 36 may be configured to adjust the types of data that are received depending on a recognized position of the train relative to certain features. The appropriate amount of data storage capacity may be determined to be any amount of data suitable for retaining the desired amount of information, such as 1-2 gigabytes of memory, or significantly smaller or larger amounts of data storage depending on the types of data that are stored. For example, storage of video data would typically require larger data storage capacity than storage of data indicative of engine operating parameters. As the determined amount of data is exceeded, additional data written to second memory module 34 may overwrite existing older data with new data. This process ensures that only the most recent data leading up to an event is recorded in second memory module 34 of crash-hardened inner case 40.

Controller 36 of longer-term memory processing unit 32 may be configured to associate and tag or encode a universal time stamp with each of the different types of data being stored in first memory module 38, and then transfer only a portion of the data being stored in first memory module 38 to second memory module 34 of the shorter-term memory processing unit. The portion of the time-tagged data from first memory module 38 that may be transferred and written to second memory module 34 may be, for example, the last 5-15 minutes of data recorded in first memory module 38. The larger capacity of first memory module 38 enables the storage of a greater quantity of data than may actually be relevant in a re-creation of any particular event, but may still be of use for various reasons including diagnostics and evaluations of performance of the locomotive. As data from the most recent period of time, such as the last 5-15 minutes, is written to second memory module 34, older data already written to second memory module 34 may be overwritten by the newer, more recent data. In alternative implementations, one of ordinary skill in the art will recognize that different lengths of time and/or amounts of data may be written from first memory module 38 to second memory module 34 inside crash-hardened inner case 40. Still further alternative implementations may include controller 36 only associating the universal time stamp with each of the different types of data when transferring data from first memory module 38 to second memory module 34.

Controller 42 of the shorter term memory processing unit may be configured to keep track of where the data is placed on second memory module 34, and may also function to provide wear leveling, which is a technique for prolonging the service life of erasable computer storage media. The wear leveling performed by controller 42 may attempt to work around limitations on the number of erase cycles any erasable segment of the memory media may be subjected to before becoming unreliable. This may be achieved by arranging data across second memory module 34 such that erasures and re-writes are distributed evenly across the media.

The event recorder of FIG. 1 may be configured to receive and record video and audio data 20, locomotive data 22, and positive train control (PTC) data 24. Controller 36 of longer term memory processing unit 32 may include integrated diagnostic, telemetry, audio, and video recording and processing capabilities. Controller 36 may also be configured to provide command and control instructions to various interfaces and processes, as well as diagnostic and event recording capabilities. Controller 36 may be configured, for example, to determine selected parameters to observe, evaluate, and if desired save or record. Controller 36 may be configured to include one or more computing or processing modules, one or more logic modules, memory, storage, registers, timing, interrupts, and the input/output signal interfaces as required to perform the desired processing. Controller 36 may be configured to receive inputs from various sensors and systems and generate output signals thereto. Suitable interfaces may also be provided to allow retrieval of recorded data from first memory module 38 and second memory module 34 without requiring the removal of the memory from outer case 30 or crash-hardened inner case 40. This capability may be useful in situations where an accident may not have occurred, but an operator may want to review events leading up to an event of interest.

Controller 36 may be configured to perform or facilitate the collection of data from various sources. Exemplary sources of data may include microphones, video recorders, GPS sensors, locomotive operational sensors, engine operating sensors, electrical sensors, exhaust gas sensors, control inputs, and PTC commands. Controller 36 may be further configured to process the data, including converting incoming data into a particular format, storing the data, and performing logical computations if necessary to determine appropriate system actions. Controller 36 may also be configured to interface with wired and/or wireless networks, process commands from an off-board data and monitoring center, perform system diagnostics, and provide health status information. Controller 36 and first memory module 38 may receive locomotive data including, but not limited to throttle settings, acceleration, speed, direction, braking conditions, wheel slip and the like.

Controller 36 may be configured to continually direct and facilitate the storage of various locomotive data in first memory module 38 on a first-in, first-out (or first overwritten) basis. This allows the event recorder to capture locomotive data leading up to an event. Similarly, controller 36 may be configured to direct the transfer of an amount of data on a first-in, first-out (first-overwritten) basis from first memory module 38 to second memory module 34 in crash-hardened inner case 40. As discussed above, the amount of data transferred from first memory module 38 to second memory module 34 may be preselected based on various empirical and/or historical factors.

Alternatively, controller 36 may be configured to initiate storing locomotive data in first memory module 38, and transferring time-stamped data from first memory module 38 to second memory module 34, upon detection of an event or via operator control on-board the locomotive or from an off-board data and monitoring center. Detection of an event may be performed using known techniques (e.g., vehicle sensors, such as accelerometers, speed sensors, locomotive operational sensors, and the like).

Controller 36 may also be configured to utilize various signals along with and in comparison to a database of stored information. Such a database may be employed to facilitate correlation of selected data with selected or specified events. A database may be employed to identify a type of event or events and a selected set of images, operational parameters, or environmental parameter data that is likely associated with or relevant to such an event. The database may be utilized for example, to determine not only the position that the train occupies on the railroad track relative to various geographical characteristics or changes in terrain, but also the location of the train relative to an upcoming point of interest or desired input for event and video recording. For example, a database or map of location information may indicate the location of the train relative to a wayside signal device, crossing, bridge, curve in the track, and the like. This information may be used to determine activation or gating of sensors, cameras, or other devices providing video/audio data 20, locomotive data 22, PTC data 24, and/or other types of data that may be of interest. For example, in an exemplary implementation, controller 36 may be configured to determine where the train is located in relation to the track route location data stored in the above-mentioned onboard database or map. Through such processing, the geographical coordinates of the train may be compared with the above-mentioned database information to determine not only on which track the train is traveling but also the particular segment and position that the train occupies on that track.

When controller 36 has determined or established the expected location and position of the train, e.g., near an upcoming crossing, wayside signaling device, and the like, controller 36 may be configured to direct the sending and receiving of desired data from various sensors or other inputs. In particular, controller 36 may be configured to direct an increased rate of video capture and monitoring of operator control commands when the train is approaching a train crossing. Additionally, controller 36 may be configured to direct recordation of selected parameters related to the operation of the locomotive and/or environmental parameters and data. These data may then be associated with selected video and/or audio data to provide detailed insight into the operation of the locomotive and other parameters and occurrences associated with past events.

In another exemplary implementation, controller 36 may be configured to facilitate operation of on-board system diagnostics and health monitoring for the locomotive, or components thereof. For example, in an exemplary implementation, controller 36 may be configured to detect, store, and transmit to an off-board central data center relevant operating system parameters and information. The relevant system parameters and information may include diagnostics of controllers 36, 42, first memory module 38, second memory module 34, or other components of the system. The diagnostics may further identify component status, and failure or inoperability including, but not limited to, loss of power, loss of operation of various sensors, failure of a universal time signal, and location of any component failures.

First memory module 38 and second memory module 34 may each provide suitable storage capacity, such as 2 gigabytes of memory in one exemplary implementation. Each of the memories may include flash memory and/or non-volatile random access memory (RAM). Moreover, controller 36 may be configured to direct the storage of diagnostic and status data on at least the longer term memory of first memory module 38. Data storage on at least first memory module 38 may also be utilized to store a variety of information that may be used in conjunction with the acquired data and parameters provided by various sensors. In particular, a database may include a stored map with historical and/or empirical data. This data may be employed in conjunction with controller 36 and/or first memory module 38 and second memory module 34 to correlate acquired data with a selected event or events. For example, the database may be employed in cooperation with a navigation system to facilitate position determination. The database may be configured to include data such as, but not limited to: the locations of railway track routes, track mapping, the locations and orientations of curves and switches in those railway track routes, the locations and/or types of each wayside device, railroad crossing, switching yard, or other known high risk areas. High risk areas may be areas such as railroad crossings where there are known to be higher rates of accidents or other abnormal events. Controller 36 may be configured to use this information in determining when to receive and store various types of data.

The database may also include data pertaining to the location of every highway or other type of crossing on all relevant railway track routes, and the distance from each crossing at which imaging should start. This location data is pegged to the identity of each railway route typically by reference to milepost distances. Moreover, the database may include various operational and environmental parameters associated with various types of events. Controller 36 may be configured to refer to the database for parameters characteristic of particular types of events, the environmental and operational parameters that may be relevant to a selected event, and activate particular types of sensors configured to provide data most relevant to the selected event.

Controller 36 may be further configured to receive data from an audio/video system positioned and configured to generate audio data and video data that is either stored directly in first memory module 38 or stored in conjunction with additional operational and environmental parameter data. As discussed above, controller 36 may also be configured to associate a universal time stamp with each of the different types of data received such that all data may be recorded with a common, universal time stamp. This feature enables the accurate synchronization of acquired data during a re-creation of any particular event.

In an exemplary implementation, the audio/video system may acquire digital audio and digital video information. However, in alternative implementations analog equipment may be employed. The audio/video system may include one or more Internet Protocol (IP) cameras and/or microphones directed as desired to obtain desired video and audio information. The IP cameras may feature aiming and zooming mechanisms that can be externally controlled to aim the camera at an upcoming object with high clarity even at relatively long distances. Sensing devices may control lighting effects, resolution, volume control for audio, frequency of imaging, data storage, and information concerning audio/video system parameters. Additionally, the audio/video system and/or sensing devices may further employ video technologies that facilitate low/no light image collection or collection of specific images. For example, controller 36 may be further configured to receive infrared images in addition to or in place of visible light images.

Controller 36 may be further configured to output data and images to a display unit configured to enable a train operator to review a wide variety of gathered data. This feature may facilitate operation or diagnostics of the locomotive simultaneously with the gathering and recording of data that may be important in the reconstruction of an event such as an accident. A display unit may feature selected video data and operational parameters including, but not limited to, wayside signal aspects, speed, power, locomotive and engine operating parameters, and environmental conditions. The display unit may also feature a graphical display used to provide the train operator with the actual video image generated by various cameras or other video input devices. Supplemental information may also be displayed such as the profile of the upcoming portion of railway track, the estimated distance required to brake the train before any particular feature, the territorial coverage of the railway operating authority or other data.

Controller 36 may also be configured to integrate diagnostic, telemetry and video recording capabilities with various communication protocols. In an exemplary implementation, controller 36 may be configured to interface with a communications system that may include, but is not limited to, a wireless satellite communications system, a cellular communications system, radio, private networks, and a Wireless Local Area Network (WLAN). In an exemplary implementation, controller 36 may be configured to transmit acquired data in addition to writing the data to first memory module 38 and second memory module 34. As a backup to the recording of the last minutes of data before an accident, controller 36 may be configured to also transmit the time-stamped data being transferred from first memory module 38 to second memory module 34. A wireless communication system including an onboard receiver and a transmitter may be configured to transmit the data between locomotives and from the locomotive to an off-board processing center. In various alternative implementations, controller 36 may be configured to transmit only data recorded to first memory module 38 for diagnostic purposes.

Controller 36 may be configured to communicate with an integrated diagnostic, telemetry and video recording system that may further include a navigation system. The navigation system may be employed to determine the position that the train/locomotive occupies on the globe. In an exemplary implementation, the navigation system may take the form of a GPS system, which can receive signals and determine global coordinates, such as latitude and longitude, directional information, velocity and time. The GPS system may provide geographic, movement, and time data to controller 36 to facilitate correlation of selected image, operational and environmental parameter data with a chronological time and/or geographic location. Universal time tag data may include chronological time, time of transmission of the various types of data, and the like. Geographic data may include latitude, longitude, velocities and the like. In an exemplary implementation, the GPS system may include a locomotive mounted antenna and receiver/computer that processes signals from low earth orbiting satellites to provide the time and position data. The GPS receiver may be accurate enough to identify a curve or a switch on which the train is located. The GPS receiver may also be coupled with other navigational aids to further facilitate accurate position location and determination. The GPS information may be combined with stored information about the track to further facilitate a determination of where the locomotive is on the track relative to fixed waypoints or entities, for example, a wayside signaling device or crossing.

Various sensor and data sources may provide the video/audio data 20, locomotive data 22, and positive train control data 24 to controller 36 in outer case 30. One source may be a locomotive control system that provides data about the operational performance and status of the locomotive. For example, this may include data on power commands, engine speed, locomotive speed, traction feedback, pneumatic brakes, brake pressures, dynamic braking, load, throttle, operating faults, ambient temperature, commanded parameters and the like. Another data source may be the multi-unit (MU) cables or trainlines that run between locomotives in a train and provide operation status and carry command and control signals. For example, the MU cables may carry signals that include data on an operator's power/brake commands, direction calls, power modes, and the like. Moreover, data can also be collected directly from various locomotive and environmental sensors, control circuits and devices, track geometry monitors, smoke and fire detectors, chemical or fuel detectors, engine-on relays and emergency brake relays or other data collection devices, locomotive horn and bell indications, hot wheel or hot bearing sensors, and impact sensors. Other environmental and operational parameters that may be observed and recorded may include, but are not limited to, weather conditions, track conditions, track topology, elevation direction and heading.

Figure 2:
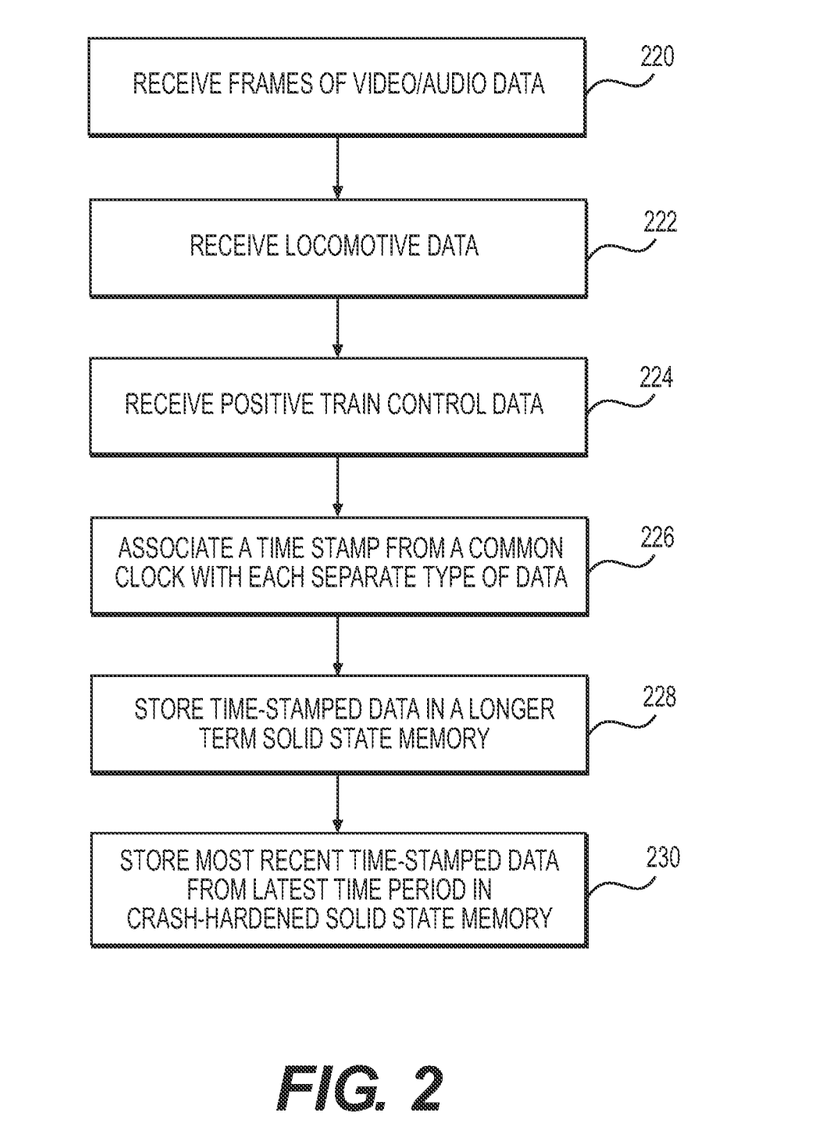
FIG. 2 depicts exemplary process or method steps that may be performed by the exemplary disclosed integrated event recording system of FIG. 1.

FIG. 2 illustrates steps of an exemplary disclosed method that may be performed by an integrated event recorder in accordance with various aspects of the disclosure. FIG. 2 will be discussed in the following section in order to further illustrate the disclosed concepts.

INDUSTRIAL APPLICABILITY

The disclosed integrated event recorder provides a system and method that may gather a wide variety of data relevant to the operation of a locomotive or other vehicle, and associate a universal time stamp with each of the different types of data that are received by a controller. The controller may direct the storage of the time-stamped data in a first, longer-term, non-volatile memory, and transfer a most recent period of the time-stamped data to a second, shorter-term, non-volatile memory protected in a crash-hardened case. The integrated event recorder includes both a longer-term memory storage within an outer case, and a shorter-term memory storage within an inner, crash-hardened case contained within the outer case. This feature allows the integrated event recorder to store and retrieve longer-term data that may be useful for diagnostic or other reasons. The integrated event recorder may transfer only the most recently acquired and time-stamped data that may be relevant in re-creating the events leading up to an accident to the shorter-term memory protected within the inner, crash-hardened case.

FIG. 2 depicts an exemplary flow chart for an implementation of an exemplary integrated event recorder. At step 220, a controller contained within an outer case of the integrated event recorder may receive frames of video and/or audio data from various sensors such as an internet protocol camera. The controller may also receive locomotive data at step 222, and positive train control data at step 224.

At step 226, the controller in the outer case of the integrated event recorder may then associate a universal time stamp from a common clock with each of the separate types of data received. The use of a common clock may help to ensure that all of the data received from different sensors may be accurately synchronized during the re-creation of events leading up to an event of interest. As a result, it may not be necessary to stitch together the different types of data that may each be associated with different time information. The controller may associate all of the data with a universal time stamp either before recording the data in the first, longer-term memory, or when transferring the data from the first, longer-term memory to the second, shorter-term memory contained within the crash-hardened inner case. By providing a universal time standard for received data, time discrepancies among data received from the different sources having independently encoded time standards may be resolved. In one exemplary implementation, a universal time stamp may be encoded on the data by the controller upon receipt of the data from the respective data sources to generate time correlated integrated information. In another exemplary implementation, a universal time stamp may be provided to each of the respective data sources, such as audio/video sensors, locomotive sensors, engine sensors, and environmental sensors. The universal time stamp may be used by the respective data sources to time tag data generated by the source before the data is provided to the controller, so that the data received by the controller arrives with a universal time stamp. In various alternative implementations, universal time information may be provided by other time standard sources, such as a locomotive clock provided by a locomotive communications module unit or an Inter-Range Instrumentation Group (TRIG) time tag generator, to synchronize the data received by the controller.

At step 228, the controller may direct the storage of all or different portions of the time-stamped data in a longer-term solid state memory. The longer-term solid state memory, as discussed in this disclosure, may be configured to store the various types of data acquired over a period of time that may be from 15-20 minutes to many hours or even days in length. The memory capacity of the longer-term memory storage may allow for the storage of sufficient data indicative of locomotive operating parameters, engine operating parameters, control commands, environmental conditions, geographical location, and other parameters and characteristics that may be useful for diagnostics and performance enhancement. The controller may also direct the storage of specific types of data, and change the frequency of data retrieval and storage depending on various parameters that may include the recognition of upcoming train crossings, tunnels, changes in terrain, and other geographical or environmental conditions.

At step 230, the controller may direct the transfer of a most recent time period of the time-stamped data from the longer-term solid state memory to a second, shorter-term solid state memory contained within a crash-hardened inner case. In one non-limiting implementation, the controller may determine that only the last 10-15 minutes of data acquired right before an accident are typically relevant to an understanding of the causes of the accident. In this implementation, the controller may continually write the last 10-15 minutes of time-stamped data stored in the longer-term memory to the shorter-term memory contained within the crash-hardened case on a first-in, first-overwritten basis.

It will be apparent to those skilled in the art that various modifications and variations can be made to the disclosed integrated event recorder without departing from the scope of the disclosure. Other implementations of the integrated event recorder will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. An event recorder, comprising:
    an outer case;
    a first memory module, including a first amount of data storage capacity, contained within the outer case, and configured to receive and store multiple types of data including at least two of: video data; audio data; locomotive data indicative of one or more locomotive operating parameters, locomotive control signals, and locomotive performance characteristics; engine operating parameter data; exhaust characteristics data; electrical data; and positive train control data;
    a first controller contained within the outer case, the first controller being configured to associate a universal time stamp with at least two of the multiple types of data stored in the first memory module;
    an inner, crash-hardened case contained within the outer case, the inner, crash-hardened case containing a second memory module, including a second amount of data storage capacity that is smaller than the first amount; and
    the first controller being further configured to periodically transfer a portion of the time-stamped data stored in the first memory module to the second memory module.

2. The event recorder of claim 1, further including a second controller contained within the inner, crash-hardened case, the second controller being configured to provide wear leveling of the data transferred from the first memory module to the second memory module by controlling where the data is placed in the second memory module.

3. The event recorder of claim 1, wherein the first controller is further configured to determine the portion of time-stamped data transferred to the second memory module based at least in part on a length of time before an event that may include significant data relevant to a cause of the event.

4. The event recorder of claim 1, wherein the first controller is further configured to provide instructions to sensors that are configured to generate the types of data the first controller determines to be the most relevant based at least in part on the geographical location of a locomotive on which the event recorder is mounted.

5. The event recorder of claim 4, wherein the first controller is further configured to provide instructions including at least one of the frequency and the type of data the sensors are to provide to the first controller based at least in part on the geographical location of the locomotive on which the event recorder is mounted.

6. The event recorder of claim 5, wherein the first controller is further configured to provide instructions including at least one of the frequency and the type of data the sensors are to provide to the first controller based at least in part on the location of the locomotive relative to at least one of a train crossing, a switching yard, and a wayside signaling device.

7. The event recorder of claim 1, wherein the first controller is further configured to provide instructions to each of sensors configured to provide the multiple types of data such that the universal time stamp is associated with each of the multiple types of data provided by the sensors before the multiple types of data are received at the first controller and stored in the first memory module.

8. The event recorder of claim 1, wherein the first controller is further configured to associate the universal time stamp with each of the multiple types of data after the multiple types of data are received by the first controller and before the first controller stores the multiple types of data in the first memory module.

9. The event recorder of claim 1, wherein the first controller is further configured to retrieve recorded data from at least one of the first and the second memory modules without requiring disassembly of the memory modules from the outer case or the inner, crash-hardened case.

10. The event recorder of claim 1, wherein the first controller is further configured to transfer a portion of the time-stamped data recorded in the first memory module to the second memory module upon detection of at least one of a predetermined event or an operator control signal.

11. A method of storing data for later re-creation of an event in the operation of a train, the method comprising:
    receiving multiple types of data including at least two of: video data; audio data; locomotive data indicative of one or more locomotive operating parameters, locomotive control signals, and locomotive performance characteristics; engine operating parameter data; exhaust characteristics data; electrical data; data indicative of an actual location of the train; and command signals that implement control of the actual location of the train;
    associating a universal time stamp with at least two of the multiple types of data;
    storing the time-stamped data in a first memory module contained within an outer case; and
    periodically transferring a portion of the stored, time-stamped data from the first memory module to a second memory module contained within a crash-hardened inner case within the outer case.

12. The method according to claim 11, further including providing with a controller contained within the crash-hardened inner case wear leveling of the data transferred from the first memory module to the second memory module by controlling where the data is placed in the second memory module.

13. The method of claim 11, further including determining the portion of the stored, time-stamped data to transfer from the first memory module to the second memory module based at least in part on a length of time before an event in the operation of the train that may include significant data relevant to a cause of the event.

14. The method of claim 11, further including:
   determining types of data most relevant to a cause of an event in the operation of the train; and
   providing instructions to sensors that are configured to generate the most relevant types of data based at least in part on a geographical location of the train.

15. The method of claim 14, further including providing instructions to the sensors including at least one of the frequency and the type of data the sensors are to generate based at least in part on the geographical location of the train.

16. The method of claim 15, further including providing instructions to the sensors including at least one of the frequency and the type of data the sensors are to generate based at least in part on the location of the train relative to a high risk area.

17. The method of claim 11, further including providing instructions to each of sensors configured to provide the multiple types of data such that the universal time stamp is associated with each of the multiple types of data by the sensors before the multiple types of data are received and stored in the first memory module.

18. The method of claim 11, further including associating the universal time stamp with each of the multiple types of data after the multiple types of data are received and before storing the multiple types of data in the first memory module.

19. The method of claim 11, further including retrieving recorded data from at least one of the first and the second memory modules without requiring disassembly of the memory modules from the outer case or the crash-hardened inner case.

20. An integrated event recorder, comprising:
   an outer case;
   a first memory module, including a first amount of data storage capacity, contained within the outer case, and configured to receive and store multiple types of data including at least two of: video data; audio data; vehicle data indicative of one or more vehicle operating parameters, vehicle control signals, and vehicle performance characteristics; engine operating parameter data; exhaust characteristics data; electrical data; and positive vehicle control data;
   a controller contained within the outer case, the controller being configured to associate a universal time stamp with each of the multiple types of data stored in the first memory module;
   an inner, crash-hardened case contained within the outer case, the inner, crash-hardened case containing a second memory module, including a second amount of data storage capacity that is smaller than the first amount; and
   the controller being further configured to transfer a portion of the data stored in the first memory module to the second memory module upon detection of at least one of a predetermined event or an operator control signal.

* * * * *